W. E. SOMERVILLE.
CABLE WINDING MACHINE.
APPLICATION FILED DEC. 26, 1914.

1,218,009.

Patented Mar. 6, 1917.
7 SHEETS—SHEET 1.

Witnesses:

Inventor:
William E. Somerville
By
Jones, Addington, Ames & Seibold
Attys

W. E. SOMERVILLE.
CABLE WINDING MACHINE.
APPLICATION FILED DEC. 26, 1914.

1,218,009.

Patented Mar. 6, 1917.
7 SHEETS—SHEET 4.

Witnesses:

Inventor:
William E. Somerville
By Jones, Addington, Ames & Seibold
Attys.

W. E. SOMERVILLE.
CABLE WINDING MACHINE.
APPLICATION FILED DEC. 26, 1914.

1,218,009.

Patented Mar. 6, 1917.
7 SHEETS—SHEET 5.

W. E. SOMERVILLE.
CABLE WINDING MACHINE.
APPLICATION FILED DEC. 26, 1914.
1,218,009.
Patented Mar. 6, 1917.
7 SHEETS—SHEET 6.
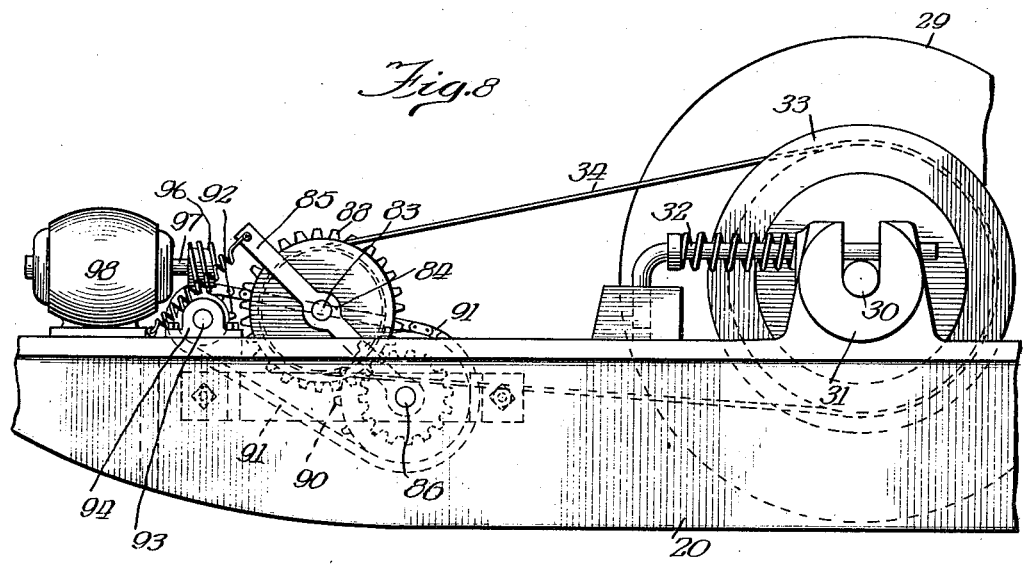
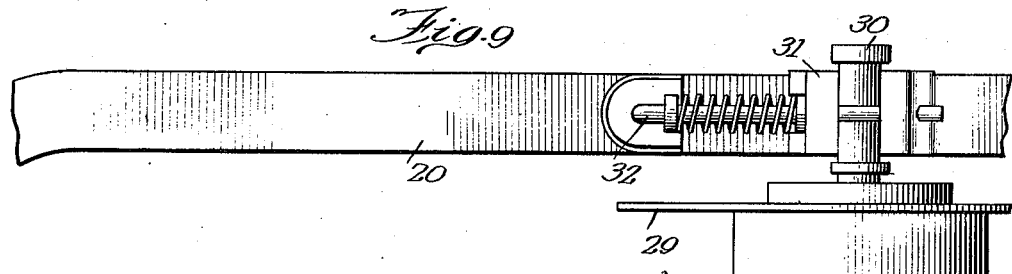
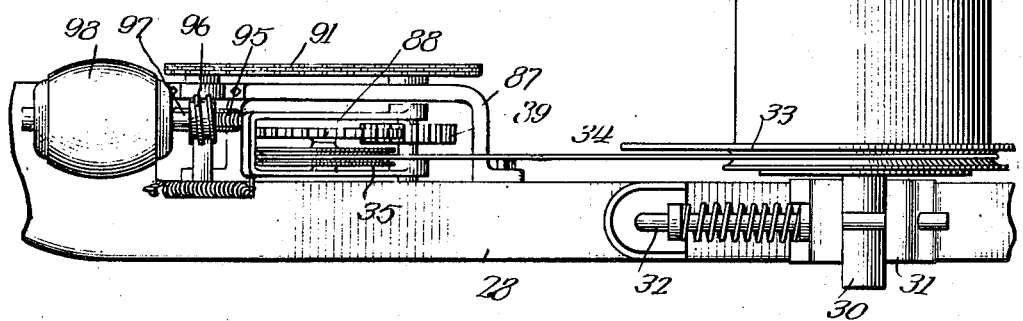

W. E. SOMERVILLE.
CABLE WINDING MACHINE.
APPLICATION FILED DEC. 26, 1914.

1,218,009.

Patented Mar. 6, 1917.
7 SHEETS—SHEET 7.

Witnesses:

Inventor:
William E. Somerville
By Jones, Addington, Ames, & Seibold
Att'ys

UNITED STATES PATENT OFFICE.

WILLIAM E. SOMERVILLE, OF COAL CITY, ILLINOIS.

CABLE-WINDING MACHINE.

1,218,009.     Specification of Letters Patent.     Patented Mar. 6, 1917.

Application filed December 26, 1914. Serial No. 879,010.

*To all whom it may concern:*

Be it known that I, WILLIAM E. SOMERVILLE, a citizen of the United States, residing at Coal City, in the county of Grundy and State of Illinois, have invented new and useful Improvements in Cable-Winding Machines, of which the following is a full, clear, concise, and exact description, reference being had to the accompanying drawing, forming a part of this specification.

My invention relates to cable winding machines, and especially to machines of the character in which the cords or wires which are to form the strand of the cable are carried by cradles which are hung so as to remain stationary within revolving cages, the wire from each coil being carried along the entire line of cages and all the wires being collected together by passing them through a stationary die at the end of the machine, a cable being thereby continuously produced. In wire cable constructions the wires that make up the cable occasionally break and before the machine can be stopped the broken wire passes through the die. Then, in order to make a perfect strand, the machine must be reversed to wind the cable back and all the slack wire must be wound back on the swifts or bobbins by hand until the broken end is brought back to a position where it can be mended. This is a slow and laborious operation owing to the fact that the machine can be reversed only a few revolutions at a time. It requires the help of several assistants and requires considerable time during which the entire machine must be idle.

Among the objects of my invention are to provide an improved device whereby the machine will be instantly stopped when a wire breaks and whereby the slack in the wires which results from winding the cable back will be taken up by the swifts or bobbins from which the wires have been unwound.

Further objects will appear from the detailed description to follow.

In the accompanying drawings, in which I have illustrated several embodiments of my invention—

Fig. 8 is a side elevation of a modified form of rewind device in which an electric motor is employed;

Fig. 9 is a plan view of the parts shown in Fig. 8;

Fig. 10 is a side elevation of a diagrammatic nature of a cable machine embodying my improvements provided with a modified form of automatic stop device;

Fig. 11 is a side elevation of an electromagnet having a latch armature shown in Fig. 10; and Fig. 12 is a detail plan view of the belt shifter shown in Fig. 10.

Figure 1:
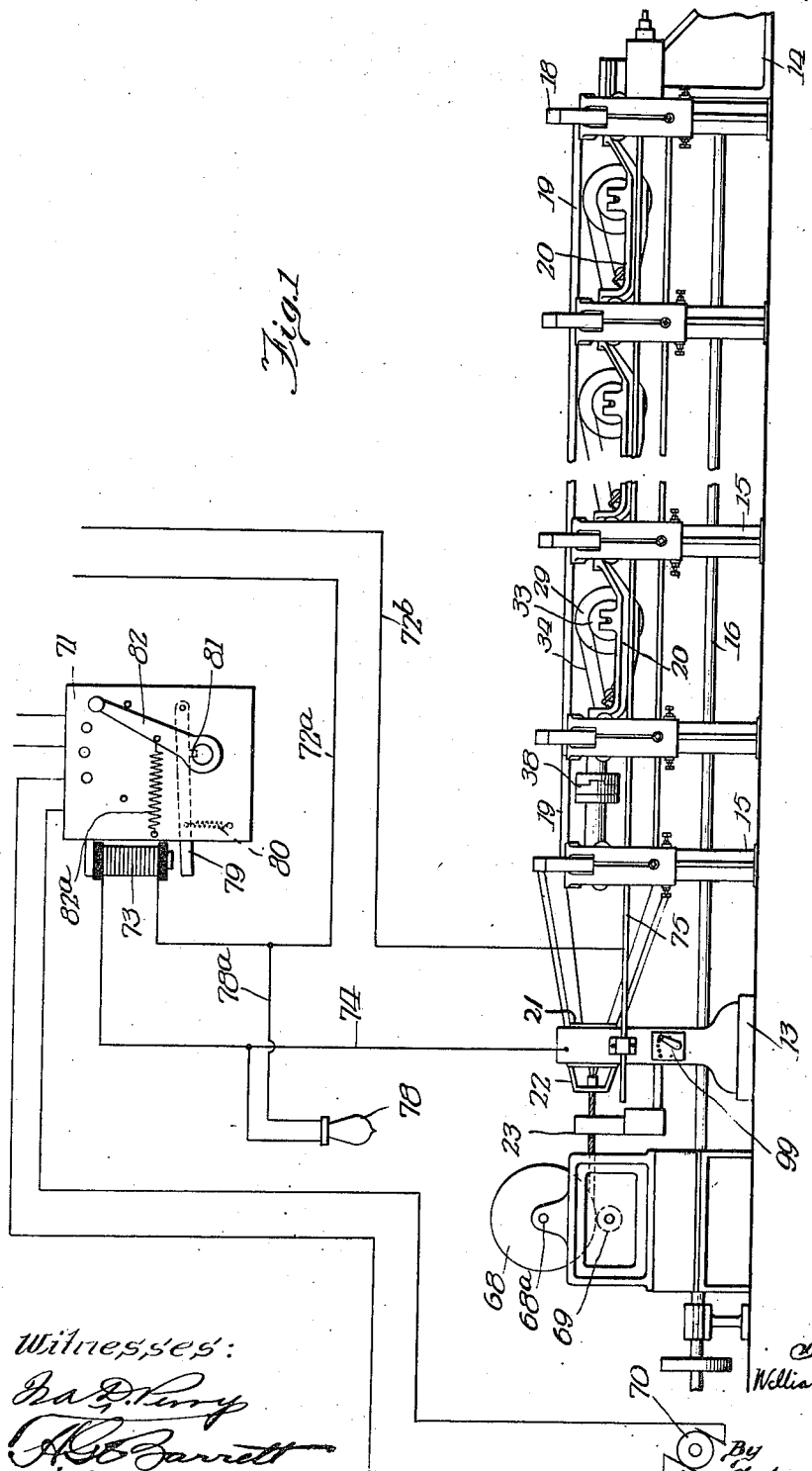
Figure 1 is a side elevation of a cable machine embodying my improvements, showing the wiring diagram for the automatic stop device.

Referring now to the drawings in detail, the machine includes a front bearing stand 13, a rear bearing stand 14, and a plurality of intermediate bearing stands 15, all except the front pair of these bearing stands being spaced apart a distance from each other equal to the length of the cages employed. Mounted to rotate in bearings in the stands 15 is a shaft 16 which carries a plurality of friction wheels 17 one for each of the bearing stands 15. Resting upon the friction wheels 17 are a plurality of wheels 18, these wheels being connected by longitudinal rods 19 secured adjacent the peripheries thereof, whereby a number of cages are formed. Hung centrally in each of these cages, so as to remain stationary while the cages rotate, is a cradle 20 which supports a coil of wire. Resting upon the front friction wheel 17 and supported in the front bearing stand 13 is a rotary head 21 which is axially connected with the nearest one of the wheels 18. The rear one of the wheels 18 has a rearwardly extending axle which is supported in a bearing carried by the bearing stand 14.

Figure 2:
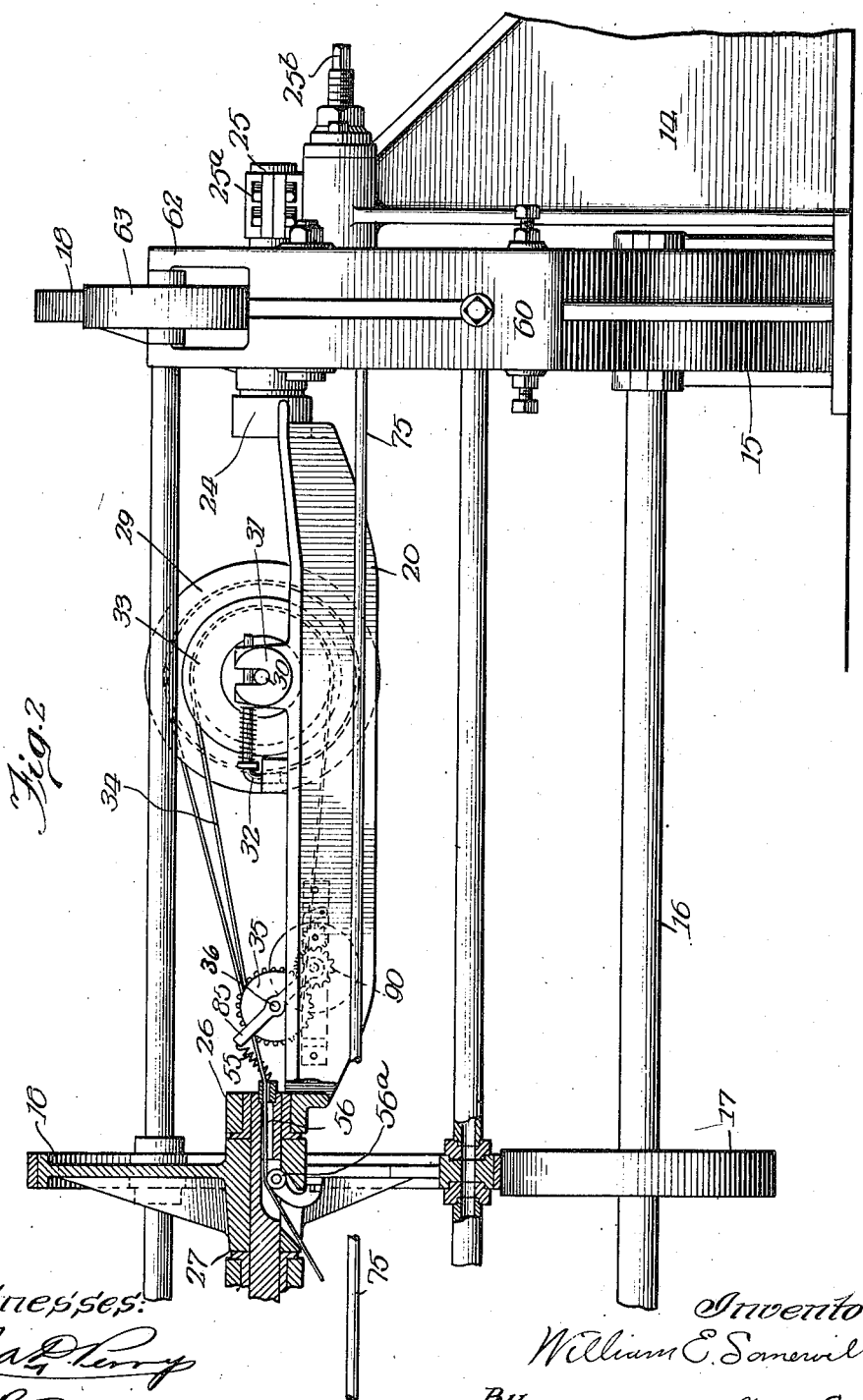
Fig. 2 is a side elevation partly in section of one of the rotating cages and the bobbin carrying cradle, showing the manner in which the wire is led through the cages, and showing also the automatic rewind device for the bobbin.
Figure 3:
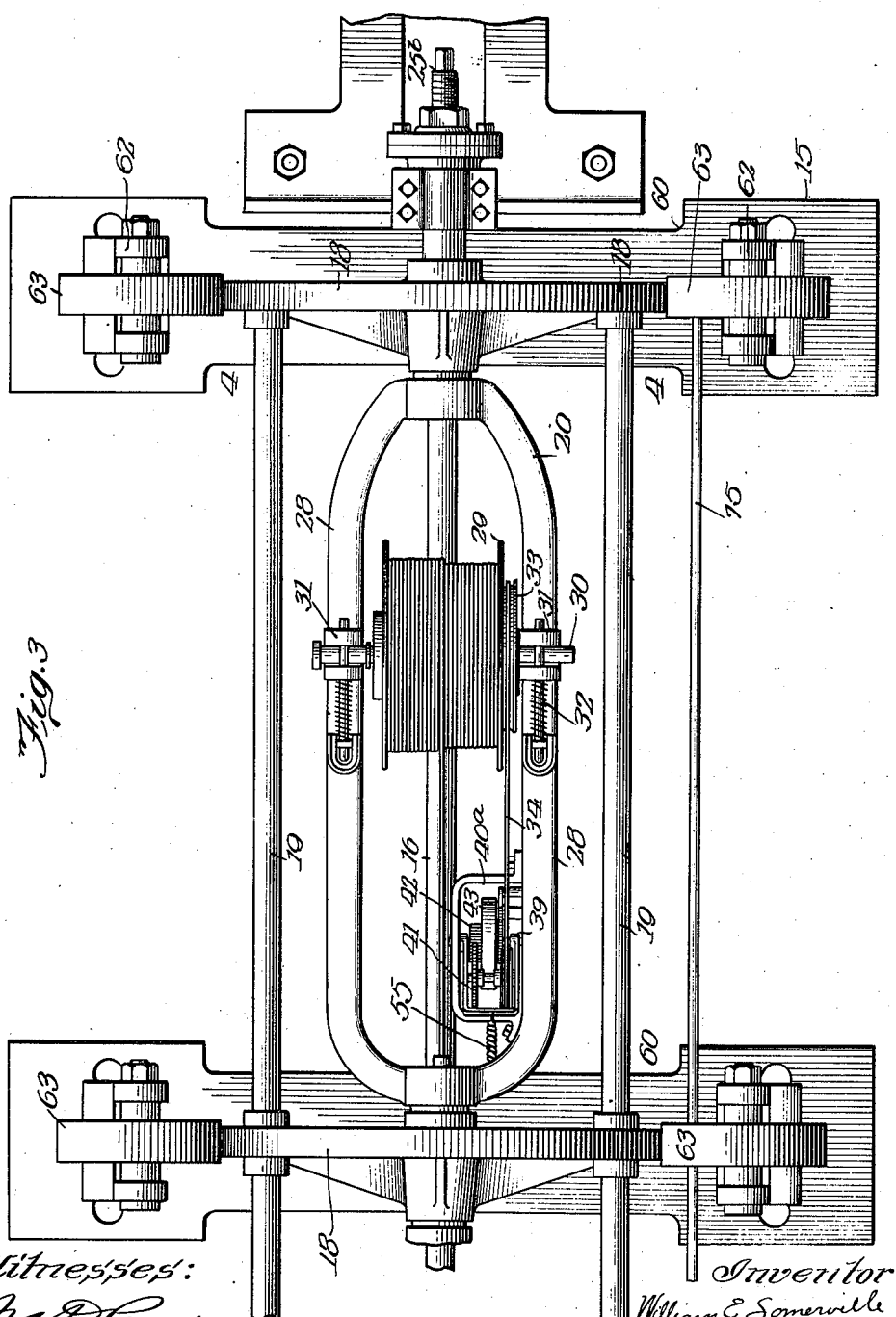
Fig. 3 is substantially a plan view of the parts shown in Fig. 2.
Figure 5:
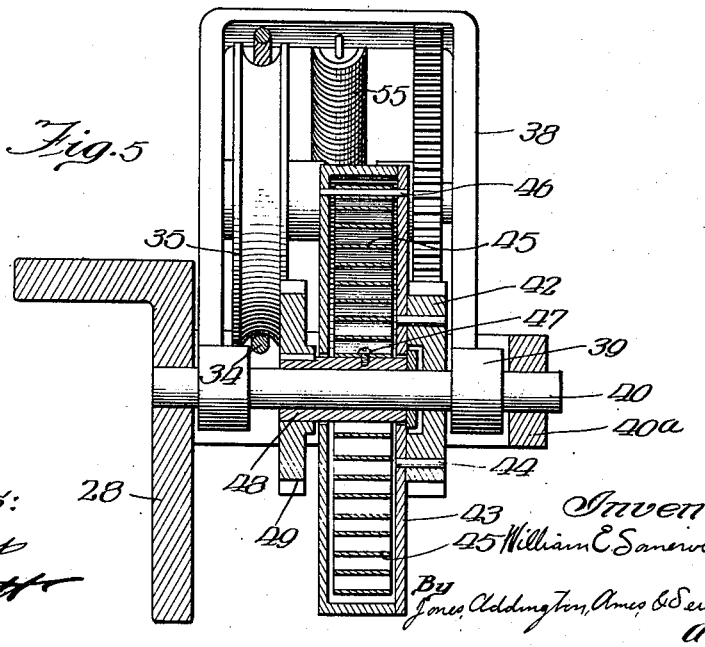
Fig. 5 is a section on the line 5—5 of Fig. 6, showing the details of the spring drum rewind motor.
Figure 6:
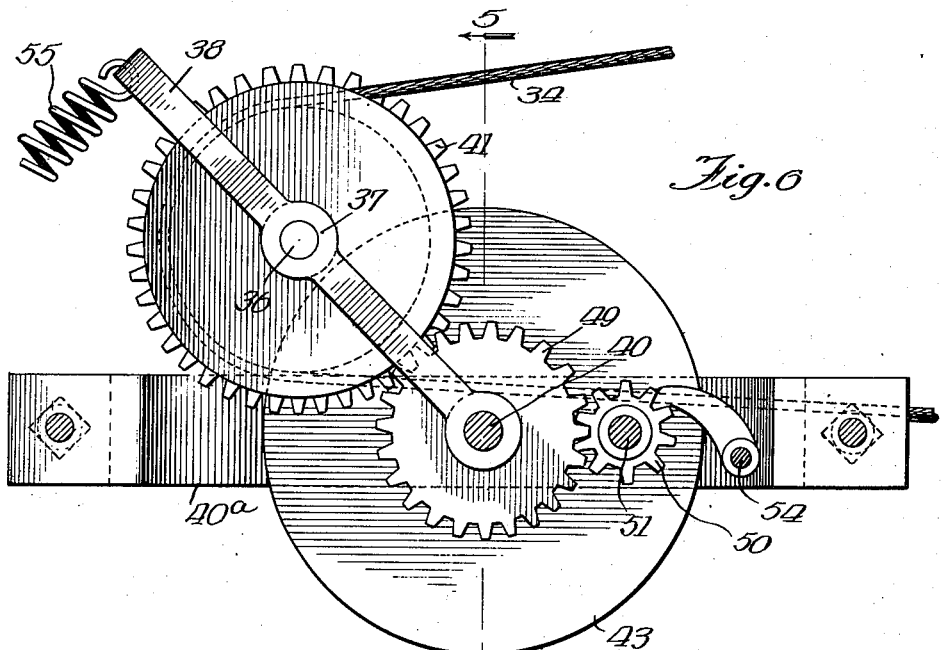
Fig. 6 is a section on the line 6—6 of Fig. 7, showing the details of the spring rewind.
Figure 7:
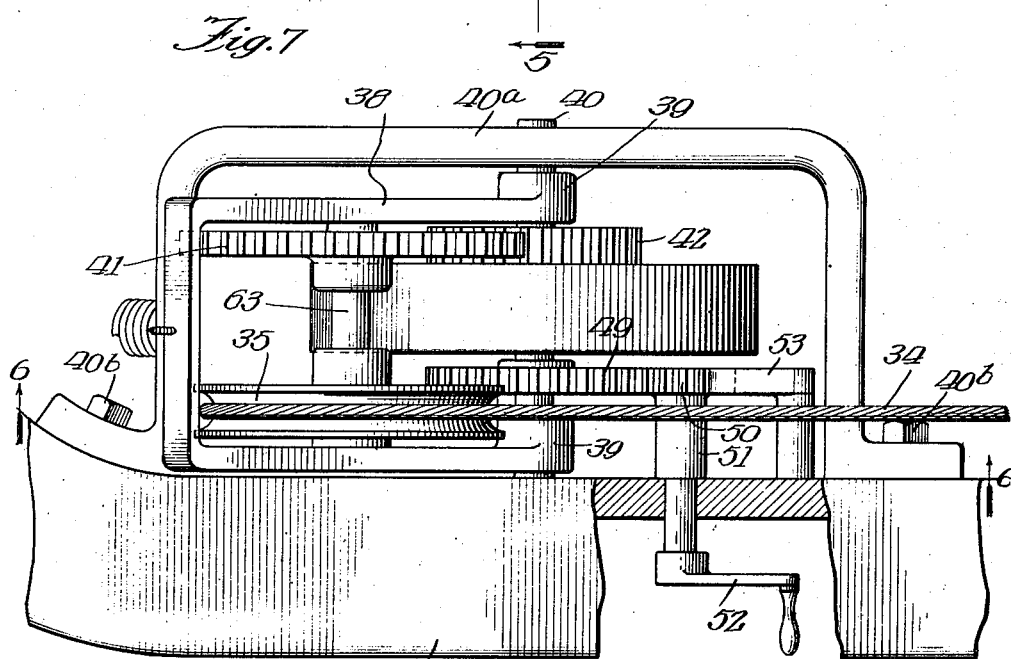
Fig. 7 is a plan view of the parts shown in Fig. 6.

It will be seen that all of the cages, together with the head 21, are caused to rotate by the frictional engagement therewith of the friction wheels 17, the cradles 20, however, remaining stationary. The wire carried by each cradle is led out through the axle of the cradle and passed over a suitable guide carried by the next succeeding cage, all the wires being carried forward through the cages so that they all enter the rotary head 21 and pass through suitably disposed apertures of a twisting die 22 carried thereby. After leaving the twisting die 22 the wires pass through a main die 23 which is stationarily mounted upon the bearing stand 13. It will be seen that as the wires are pulled through the main stationary die 23 they will be formed into a twisted strand. The rear end of the rear cradle 20 is provided with a journal 24 which receives the end of an axle 25 mounted in a journal 25$^a$ which is longitudinally adjustable by means of a screw 25$^b$. The opposite end of the cradle is provided with a journal 26 which fits over the end of a stub axle 27 secured in the hub of the next succeeding wheel 18 as shown in Fig. 2. The cradle 20 comprises, as shown in Figs. 2 and 3, a yoke-shaped frame 28 which provides a support for the swift or bobbin 29 on which is wound a strand of wire. This swift is supported on a shaft 30 which rests in the notched journal 31 extending up from the sides of the cradle, and the shaft is locked in position by a spring pressed latch 32. In order to prevent the swift unwinding too rapidly, or so rapidly that the wire would tend to become buckled, the swift 29 is provided on its side with a pulley 33 over which passes a tension band or belt 34. This tension band 34 and the pulley 33 also form part of the rewind device as hereinafter described in detail. The belt 34 passes over a pulley 35 keyed on a shaft 36, rotatably mounted in bearings 37 on a yoke member 38 provided with hub portions 39 pivotally mounted on the shaft 40. Also keyed on the shaft 36 is a spur gear 41 which meshes with a spur gear 42 secured to the casing 43 of a spring drum by means of pins 44, as shown in Figs. 5, 6 and 7. A spiral spring 45 is secured within the casing 43. One end of the spring 45 is secured to the casing by means of a pin 46. The other end of the spring is secured by means of screws 47 to a sleeve 48 rotatably mounted on the shaft 40. Keyed to the sleeve 48 is a spur gear 49 with which meshes a spur pinion 50 keyed on a shaft 51 which is rotatably mounted in the frame 28. A handle 52 is keyed on the shaft 51 for winding up the spring 45. A pawl 53 pivotally mounted on a pin 54 in the frame 28 engages the teeth of the spur pinion 50 to prevent the spring 45 from unwinding. A spring 55 has one end secured to the yoke member 38 and its other end secured to the frame 28 to maintain the proper tension in the band 34 as shown in Figs. 3 and 6.

As shown in Fig. 2 the wire from each swift or bobbin 29 is passed through an opening 56 in the axle of the wheel 18 immediately in front of the same and passing down over a roller 56$^a$ is carried by suitable guides to openings 57 in each of the succeeding wheels 18 until it is brought out through the rotary hub 21. The forward end of the hub 21 is provided with a twisting die 22, as previously stated, which is provided with a plurality of openings, one for each strand of wire, and is secured to rotate with the hub 21. A universal joint 58 is provided between the hub 21 and the adjacent wheel 18. The shaft 16 is mounted in a plurality of journal boxes 59 on one side of the friction wheels 17, and these journal boxes are formed in the side portions of the bearing stands 15. These bearing stands are each provided with upwardly extending side members 60 on which are pivotally mounted, at 61, swinging arms 62 for the guide rollers 63 for the wheels 18. These arms 62 are preferably channeled so that they fit over the side members 60 and the lower ends thereof are slotted as at 64 to receive the bolts 65 extending from each side of the side members 60. Suitable clamping nuts 66 are provided to hold the lower ends of the arms 62 in any adjusted position to which they may be moved. In addition to this means for holding the arms in their adjusted position I provide a stop screw 67 which passes through the end of the arm and abuts against the edge of the side member 60.

Figure 4:
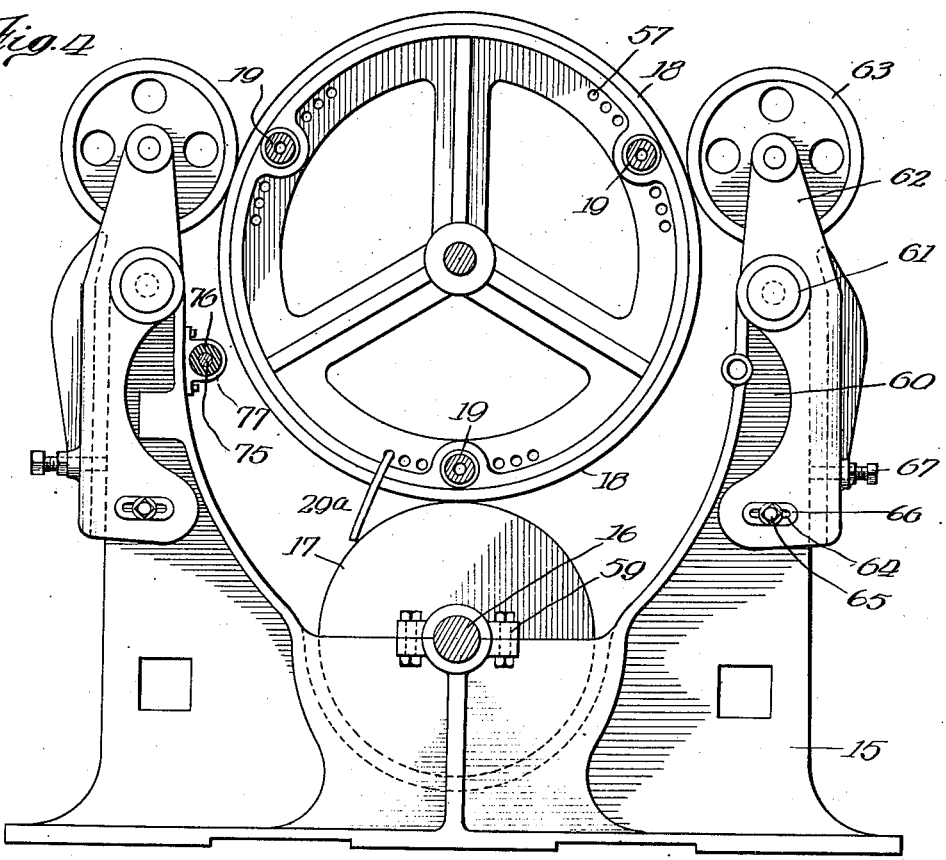
Fig. 4 is a section on the line 4—4 of Fig. 3, showing the manner of driving and rotatably supporting the cages.

By the above described construction the guide rollers 63 may be adjusted to a position to hold the wheels 18 in their proper relation. A pull-off drum 68 is arranged at the front of the machine and is mounted upon a suitable shaft 68$^a$. As the cable has a tendency to slip on the pull-off drum 68 I provide a tension device in the form of a pressure roller 69. This roller bears against the under side of the pull-off drum and holds the cable in engagement with said drum. Reference character 70, in Fig. 1, indicates an electric motor which drives the pull-off drum 68 and the shaft 16 by any suitable transmission mechanism (not shown). 71 indicates a controller for the motor 70. A conductor 72$^a$ leads to an electromagnet 73 from which leads a conductor 74 which is grounded in any suitable manner as by connecting it to the frame of the machine as shown in Fig. 1. A conductor 72$^b$ leads to a rod 75 of conducting material which extends through insulating sleeves 76 mounted in brackets 77 on the side members 60 of the stands 15 as shown in Fig. 4. The conductors 72$^a$ and 72$^b$ may be connected with any suitable source of current (not shown). Reference character 78 indicates an electric lamp placed in a circuit 78ª parallel with the electromagnet 73. A pivoted latch armature 79 is normally held by means of a coil spring 80 in a position in which the latch member 81 engages a corresponding recess in the shaft of the controller arm 82. A coil spring 82ª connected to the controller arm tends to move the controller arm to a position in which it will stop the motor 70.

The use and operation of the modification thus far described is as follows: The bobbins 21 having wire coiled thereon are placed in position in the cradles 20 and the wires from the bobbins are threaded through the machine through the twisting die 22 and the stationary die 23, and the ends are inserted between the pull-off drum 68 and the pressure roller 69. The motor 70 is then started to cause the pull-off drum to draw the wires through the machine and also to cause the cages to rotate. In case one of the wires 29ª should break it will fly out, due to centrifugal force, as shown in Fig. 4, and as the wheel 18 rotates the broken end of the wire will be brought into contact with the conductor 75. This will permit current to flow through the electromagnet 73, conductors 72ª, 72ᵇ and 74, rod 75, wire 29ª, and wheel 18 to the framework of the machine and to ground. When the electromagnet 73 is energized to attract the armature 79 the latch member 81 will be disconnected from the controller arm 82 which will be released to stop the motor 70 which drives the pull-off drum 68 and the cage rotating shaft 16. The machine will thus be brought to a stop. In case the forward end of the broken wire has been drawn through the dies into a position where it cannot be reached for splicing or mending the cable must be wound back until this broken end can be reached. As the cable is wound back the slack in each of the unbroken wires is taken up by means of the spring 45 which acts through the gears 42 and 41, the pulleys 35 and 33 and the band 34 to rotate the bobbin 29 in a direction to rewind the wire on the bobbin. In this connection it is to be noted that the tension in the band 34, due to the spring 55, is such that the rotation of the pulley 33, as the wire is unwound from the bobbin, will cause the spring 45 to stay wound up after it has once been wound up by means of the handle 52. After the cable has been wound back far enough so that the forward end of the broken wire is accessible for mending, the rearward end of the broken wire is threaded forward through the machine and brought into engagement with the forward end to which it is then secured. The machine can then be started up again.

In Figs. 8 and 9 I have illustrated a modification of the rewind mechanism in which the rewinding is accomplished by means of a number of electric motors (one for each swift or bobbin) mounted on the cradles 20. In this modification the pulley 35 over which the band 34 passes is keyed to a shaft 83 which is rotatably mounted in bearings 84 on a yoke 85 which is pivotally mounted on a shaft 86. The shaft 86 has one end rotatably mounted in a bracket 87 and its other end in the frame 28. Also keyed on the shaft 82 is a spur gear 88 which meshes with a spur pinion 89 keyed on the shaft 86. Also keyed on the shaft 86 is a sprocket 90 over which passes a sprocket chain 91 which is driven by a sprocket 92 keyed on the shaft 93 which is mounted in bearings 94. Also keyed on the shaft 93 is a worm gear 95 driven by a worm 96 keyed on the motor shaft 97 of the motor 98. All of the motors 98 for rewinding the several bobbins 29 are controlled by means of a single starting lever 99 whereby all of the motors can be thrown into operation to rewind the several wires simultaneously.

The operation of this modification of the rewind mechanism is as follows: If a break occurs in one of the wires and the forward end of the broken wire is not accessible for mending, the rearward end of the broken wire is first secured in any suitable manner to prevent its being rewound on a bobbin and the machine is then reversed to wind the cable backward. The starting lever 99 is also moved to cause the operation of the motors 98 to rotate the swifts 29 in a direction to rewind the wires thereon whereby the slack due to rewinding the cable will be taken up. The motor 98 which drives the bobbin 29 corresponding to the broken wire will also be put in operation, of course, but as the end of the broken wire has been secured to prevent its being rewound on the bobbin the operation of the motor 98 will merely cause slippage between the band 34 and the pulleys 33 and 35. If the other motors 98 operate faster than is necessary to rewind the wires on the swifts this will also cause some slippage of the band 34. After the cable has been wound back until the broken end of the wire is accessible the two broken ends are brought together and mended and the operation of the machine can then proceed. The electric motor rewind mechanism has this advantage over the modification in which a spring drum is employed in that the electric motors do not operate to rewind until the starting lever 99 is actuated. Whereas with the spring drum rewind mechanism as soon as the wire breaks the spring motor, corresponding to the broken wire, will immediately act to rewind the broken wire on the bobbin, thereby still further separating the broken ends of the wire.

It will be noted that in both modifications of the rewind mechanism the pulleys 33 and 35 and the belt 34 constitute a tension device during the normal operation of the machine to prevent the bobbin from unwinding too rapidly.

In Figs. 10, 11 and 12 I have illustrated a modification of the automatic stop mechanism in which the operation of the machine is stopped by shifting the belt from a driving to an idler pulley. In this modification reference character 100 indicates a driving pulley for the shaft 16, and 101 indicates an idler pulley which is free to rotate on the shaft 16. The driving belt 102 may be shifted from one pulley to the other by means of a belt shifter 103 slidably mounted in bearings 104 and connected by means of a rod 105 to an operating lever 106 on which is pivotally mounted a latch member 107 having an arm 107$^a$ integral therewith. The latch 107 engages a segment 108 to hold the lever 106 in adjusted position. A weight 109 is slidably mounted on a vertical rod 110 in a position immediately above the arm 107$^a$ when the latter is in the dotted line position shown in Fig. 10. An electromagnet 111 is connected with the conductor 72$^b$ from the battery 72 and with the conductor 74 leading to the rod 75. The electromagnet 111 is provided with a latch armature 112 which is provided with a hook 113 normally held in engagement with the weight 109 by means of a spring 114. The lever 106 is connected by means of a spring 115 with a lever 117 provided with a latch 118 which engages a segment 119 to hold the lever 117 in adjusted position. The latch 118 is operated by means of a small hand lever 120.

The operation of this stop mechanism is as follows:

During the normal operation of the machine the lever 106 is in the dotted line position shown in Fig. 10 in which position the belt 102 engages the driving pulley 100 to cause the operation of the shaft 16. In case one of the wires from one of the bobbins 29 breaks the broken end will be brought into engagement with the rod 75 to permit current to flow through the electromagnet 111 to attract the armature 112 and release the weight 109. When the weight 109 is released it falls and strikes the arm 107$^a$ releasing the latch 107 from the segment 108. The spring 115 then draws the lever 106 to the left to cause the shifting of the belt 102 from the driving pulley 100 to the idler pulley 101; the shaft 16 which drives the machine then comes to a stop. The purpose of the lever 117 is to adjust the spring 115 to the proper tension to move the lever 106 to cause the shifting of the belt 102.

In the claims I have used the word "swift" in referring to the devices on which the wire is coiled, but it is to be understood that this term is broad enough to include any wire carrying device from which wire may be withdrawn.

Having thus described my invention what I claim as new and desire to secure by Letters Patent is;—

1. A cable machine including a plurality of swifts, means for drawing wire from said swifts, and an electric motor for each swift for rewinding the wire on said swift.

2. A cable machine including a plurality of swifts, means for drawing wire from said swifts, and means for rewinding the wire on said swifts, including a pair of pulleys, a belt therefor, and yielding means for tensioning said belt.

3. A cable machine including a plurality of swifts, means for drawing wire from said swifts, and means for rewinding the wire on said swifts, including a pair of pulleys, a belt therefor, and a pivotally mounted member on which one of said pulleys is rotatably mounted.

4. A cable machine including a plurality of swifts, means for drawing wire from said swifts, and means for rewinding the wire on said swifts, including a pair of pulleys, a belt therefor, and a pivotally mounted member on which one of said pulleys is rotatably mounted, and a spring connected to said pivotally mounted member for tensioning said belt.

5. A cable machine including a plurality of swifts and a rotatable wire guide, means for drawing wire from said swifts, and electrical means whereby when one of said wires breaks said drawing means will stop, including a conductor adjacent the path of the rotating wire whereby when the wire breaks it will come in contact with said conductor.

6. A cable machine including a plurality of swifts and a rotatable wire guide, means for drawing wire from said swifts, and electrical means whereby when one of said wires breaks said drawing means will stop, including a conductor adjacent the path of the rotating wire whereby when the wire breaks it will come in contact with said conductor, and including an electromagnet connected with said conductor.

7. A cable machine including a plurality of swifts, and a rotatable wire guide, electric motor means for drawing wire from said swifts, and electrical means whereby when one of said wires breaks said drawing means will stop, including a conductor adjacent the path of the rotating wire whereby when the wire breaks it will come in contact with said conductor, and including an electromagnet connected with said conductor.

8. A cable machine including a plurality of swifts and a rotatable wire guide, means for drawing wire from said swifts, and electrical means whereby when one of said wires breaks said drawing means will stop, including a conductor adjacent the path of the rotating wire whereby when the wire breaks it will come in contact with said conductor, and including an electromagnet connected with said conductor, and including a belt shifter controlled by said electromagnet.

9. A cable machine comprising a plurality of co-axial rotatably mounted cages, a cradle suspended in each of said cages provided with means for supporting a swift, means for drawing wire from said swifts, and automatic means for stopping said drawing means when the wire breaks, said means including an electrical conductor extending longitudinally of said machine substantially parallel to the axis of said cages, a latch member, a motor, and a pull-off drum driven by said motor, said latch member being so positioned as to operate to stop the motor when the broken wire is rotated into contact with said electrical conductor.

In witness whereof, I have hereunto subscribed my name in the presence of two witnesses.

WILLIAM E. SOMERVILLE.

Witnesses:
WILLIAM G. SUFFERN,
JOSEPH BATA, Jr.